(12) United States Patent
Lin

(10) Patent No.: US 9,182,084 B2
(45) Date of Patent: Nov. 10, 2015

(54) LED ELEMENT HAVING ELONGATED LED AND DIRECT-TYPE BACKLIGHT MODULE USING THE SAME

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/080,812

(22) Filed: Nov. 15, 2013

(65) Prior Publication Data

US 2015/0055325 A1    Feb. 26, 2015

(30) Foreign Application Priority Data

Aug. 22, 2013   (TW) .............................. 102130010 A

(51) Int. Cl.
*F21V 3/00* (2015.01)
*F21V 5/00* (2015.01)
*F21K 99/00* (2010.01)
*F21V 14/02* (2006.01)
*F21V 14/06* (2006.01)
*F21V 5/04* (2006.01)

(52) U.S. Cl.
CPC ... *F21K 9/50* (2013.01); *F21V 5/04* (2013.01); *F21V 5/045* (2013.01); *F21V 14/02* (2013.01); *F21V 14/06* (2013.01)

(58) Field of Classification Search
CPC ........... F21V 5/045; F21V 5/04; F21V 14/06; F21V 14/02
USPC ............................................. 362/311.06, 232
See application file for complete search history.

(56) References Cited

U.S. PATENT DOCUMENTS

2010/0118531 A1\* 5/2010 Montagne ..................... 362/235
2011/0280014 A1\* 11/2011 Householder et al. ........ 362/235
2012/0268946 A1\* 10/2012 Chen et al. ............... 362/311.09

\* cited by examiner

*Primary Examiner* — Karabi Guharay
*Assistant Examiner* — Zachary J Snyder
(74) *Attorney, Agent, or Firm* — Novak Druce Connolly Bove + Quigg LLP

(57) ABSTRACT

An LED element includes an LED and a lens located over the LED. The LED has a rectangular light outputting face. The lens has a light outputting face. The light outputting face of the lens includes a first light outputting portion and two second light outputting portions. The first light outputting portion performs a convergent function to light output along a long side of the rectangular light outputting face of the LED. The second light outputting portion performs a divergent function to the light output along a short side of the rectangular light outputting face of the LED. The light emitted from the lens has an energy intensity distribution the same along each of two perpendicular directions of the long side and short side of the rectangular light outputting face.

18 Claims, 5 Drawing Sheets

LED ELEMENT HAVING ELONGATED LED AND DIRECT-TYPE BACKLIGHT MODULE USING THE SAME

BACKGROUND

1. Technical Field

The disclosure relates to light emitting apparatuses, and particularly to a light emitting diode (LED) element with a symmetric luminous distribution and a direct-type backlight module using the same, wherein the LED element has an elongated (rectangular) LED and a lens for converting light from the LED which is originally asymmetric in X-axis and Y-axis distribution into the symmetric luminous distribution in both the X-axis and Y-axis.

2. Description of Related Art

A conventional direct-type backlight module served as a backlight source for an LCD (liquid crystal display) television or an LCD monitor includes a number of LEDs, and a diffusing plate located above the LEDs. A larger distance should be kept between each of the LEDs and the diffusing plate, so that light generated from the LEDs is not concentrated in some points of the diffusing plate of the direct-type backlight module. If the distance between each of the LEDs and the diffusing plate is increased, a thickness of the direct-type backlight module would be increased accordingly, which is unfavorable for the compact tendency of electronic device. Therefore, a number of lenses are provided to cover the LEDs, so that the number of the LEDs needed and the thickness of the direct type backlight module are reduced, and the light inputting angle of light entering the diffusing plate is converted (diffused) by the lenses before the light emitted from the LEDs enters the diffusing plate. The LEDs used in the direct type backlight module are square LEDs with symmetric luminous distribution. LEDs used in the edge-type backlight module are elongated LEDs with asymmetric luminous distribution. However, the elongated LEDs can only be used in the edge-type backlight module and can not be used in the direct-type backlight module, which results in increased costs for inventory management of the LEDs.

What is needed, therefore, is an LED element having an elongated LED and a direct-type backlight module using the same which can overcome the limitations described above.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
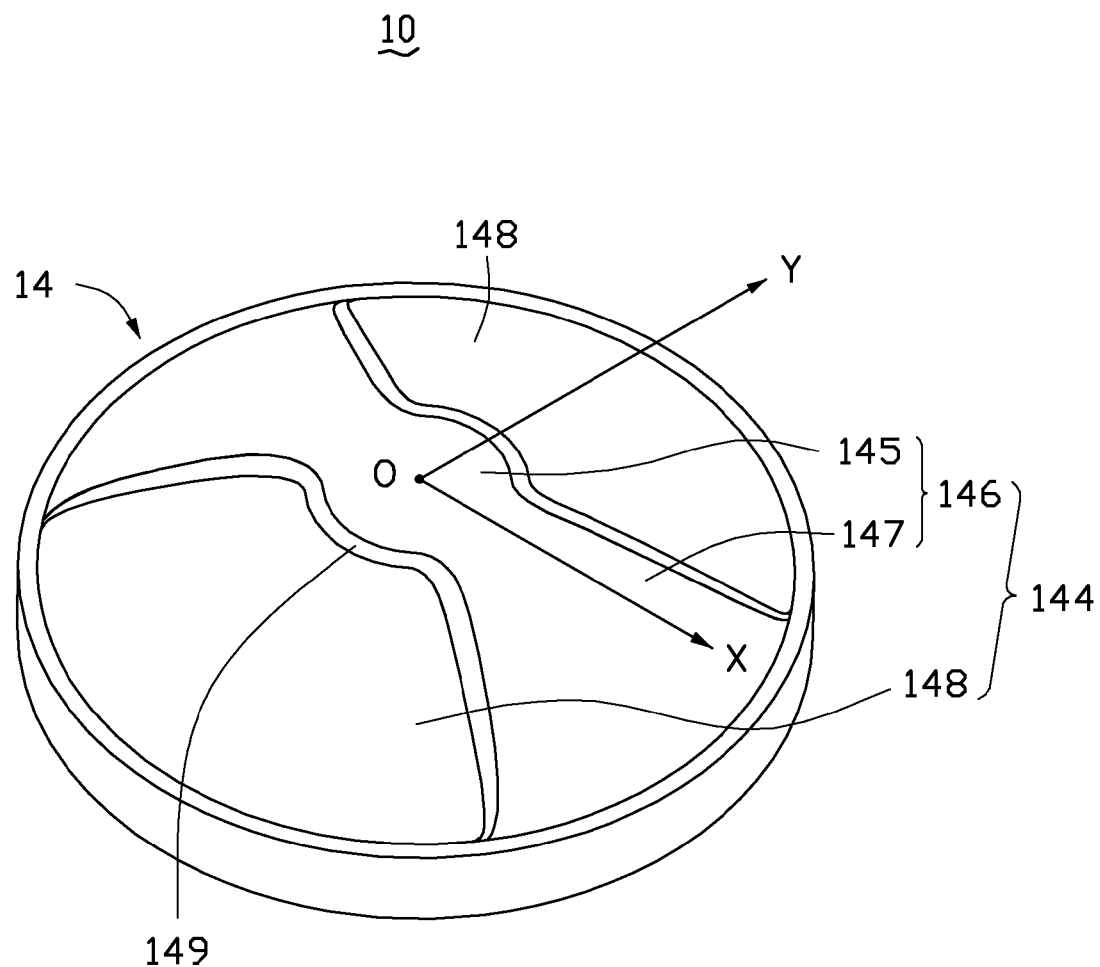
FIG. 1 is a schematic view of an LED element in accordance with an embodiment of the present disclosure.
Figure 2:
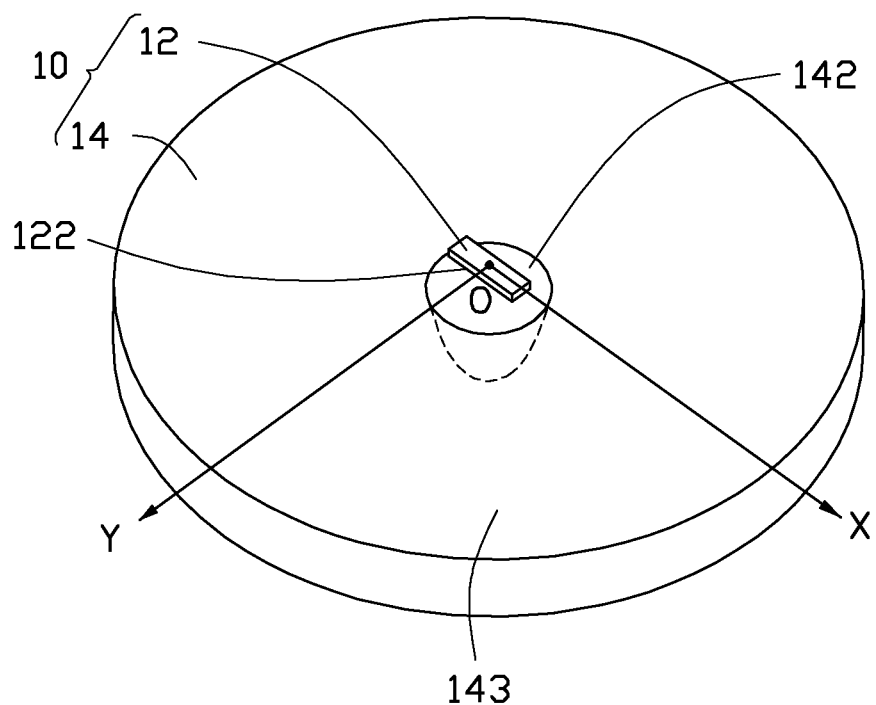
FIG. 2 is an inverted view of the LED element of FIG. 1.

Referring to FIGS. 1-2, an LED element 10 in accordance with an embodiment of the present disclosure includes an elongated (rectangular) LED 12 and a lens 14 located above the LED 12. The LED 12 is, for example, a 7020 (7×2 mm) LED.

The LED 12 has a rectangular light outputting face 122 facing a bottom of the lens 14. An imaginary rectangular coordinate system is introduced for convenient description of the present disclosure. The light outputting face 122 of the LED 12 is located in an XOY plane which is defined by an X axis and a Y axis of the rectangular coordinate system and located in a horizontal plane. A center of the light outputting face 122 of the LED 12 and an origin O of the rectangular coordinate system coincide with each other. Opposite short sides of the light outputting face 122 of the LED 12 extend along the Y axis. Opposite long sides of the light outputting face 122 of the LED 12 extend along the X axis.

Figure 3:
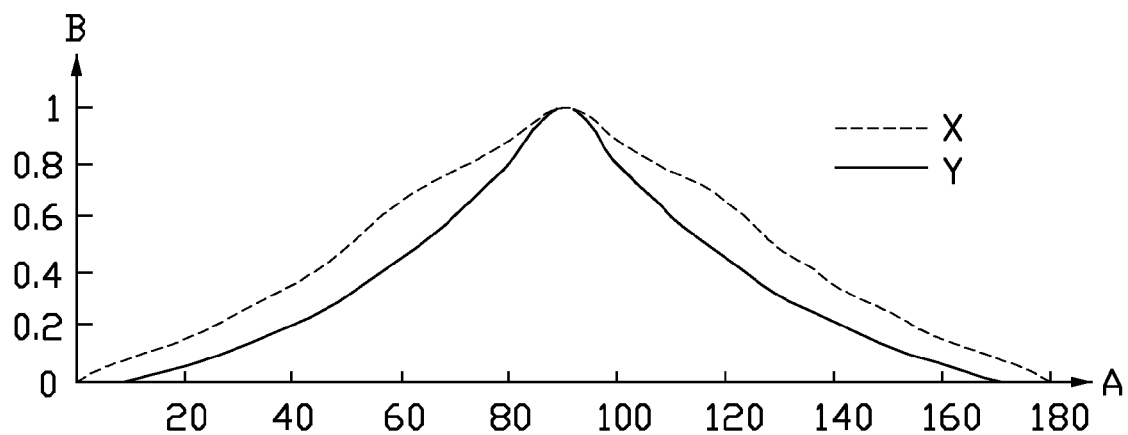
FIG. 3 is a coordinate diagram showing an energy distribution for an LED of the LED element of FIG. 1.

FIG. 3 is a coordinate diagram showing a light energy intensity distribution for the LED 12. Abscissa A of the coordinate diagram means a light irradiating angle of the light irradiated from the LED 12. Ordinate B of the coordinate diagram means an energy intensity of the light irradiated from the LED 12. Since the long sides of the light outputting face 122 of the LED 12 are longer than the short sides of the light outputting face 122 of the LED 12, an irradiating angle range of the light irradiated from the LED 12 along the X axis direction is bigger than that of the light irradiated from the LED 12 along the Y axis direction. That is, the energy intensity distribution of the light irradiated from the LED 12 along the X axis direction is more dispersed than the energy distribution of the light irradiated from the LED 12 along the Y axis direction, so that the light irradiated from the LED 12 forms an asymmetric luminous distribution.

The lens 14 has a light inputting face 142 and a light outputting face 144. The light emitted from the LED 12 enters the lens 14 via the light inputting face 142, and then exits the lens 14 from the light outputting face 144. The lens 14 has a circular outer circumference.

The light inputting face 142 is a curved face which recesses inwardly toward a top of the lens 14 and faces the light outputting face 122 of the LED 12. The light inputting face 142 is a spherical surface or an aspheric surface. In this embodiment, the light inputting face 142 is an aspheric surface.

The light outputting face 144 is an upwardly-protruding arced surface and has a surface area larger than that of the light inputting face 142. The light outputting face 144 of the lens 14 includes a first light outputting portion 146 and two second light outputting portions 148 located at two opposite sides of the first light outputting portion 146, respectively. A generally M-shaped boundary is defined between each of the two second light outputting portions 148 and the first light outputting portion 146. The first light outputting portion 146 is a curved face which protrudes outwardly and upwardly from a periphery to a center thereof, with a central portion thereof around the origin O being round and flat. Each second light outputting portion 148 is also protruded outwardly and upwardly toward the origin O, wherein an edge of the each second light outputting portion 148 adjoining the first light outputting portion 146 is below a correspondingly neighboring edge of the first optical portion whereby a vertical wall 149 is formed between the first light outputting portion 146 and each second light outputting portion 148. The vertical wall 149 is perpendicular to a bottom face 143 of the lens 14. The first light outputting portion 146 includes a circular first portion 145 located at a center of the lens 14, and two second portions 147 extending slantwise downwardly from two opposite sides of the first portion 145, respectively. A projection of the first light outputting portion 146 on the XOY face is symmetrical relative to the X axis, and symmetrical relative to the Y axis. The first portion 145 of the first light outputting portion 146 is directly opposite to the LED 12. A projection of each second portion 147 of the first light outputting portion 146 on the XOY face is fan-shaped and symmetrical about the X axis. A projection of the two second portions 147 on the XOY face is symmetrical about the Y axis. A projection of each second light outputting portion 148 on the XOY face is fan-shaped and symmetrical about the Y axis. A projection of the two second light outputting portions 148 on the XOY face is symmetrical about the X axis. The outer circumference of each second portion 147 of the first light outputting portion 146 is shorter than the outer circumference of each second light outputting portion 148.

Figure 4:
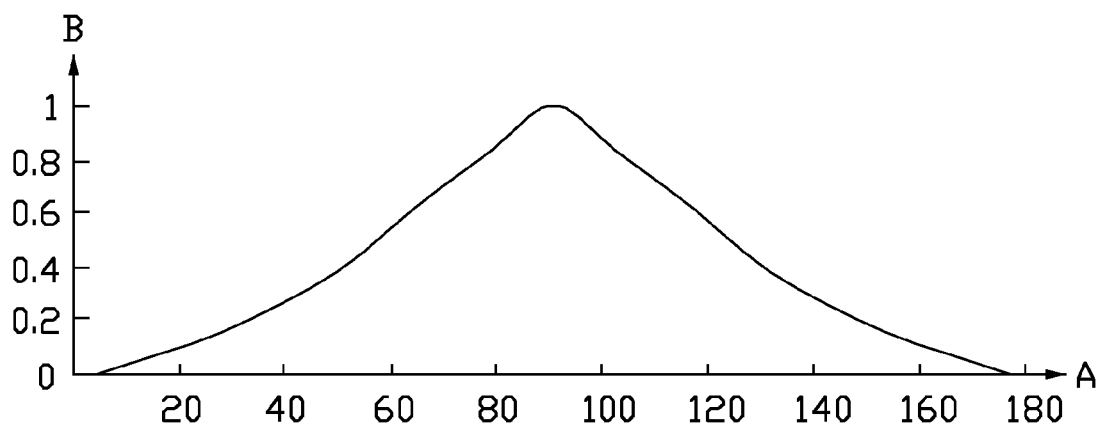
FIG. 4 is a coordinate diagram showing an energy distribution for the LED element of FIG. 1.

FIG. 4 is a coordinate diagram showing an energy intensity distribution for the light of the LED element 10. The first light outputting portion 146 of the lens 14 performs a convergent function to the light output along the long sides of the rectangular light outputting face 122 of the LED 12, so that the irradiating angle range of the light irradiated from the LED 12 along the long sides of the rectangular light outputting face 122 is reduced. The second light outputting portion 148 of the lens 14 performs a divergent function to the light output along the short sides of the rectangular light outputting face 122 of the LED 12, so that the irradiating angle range of the light irradiated from the LED 12 along the short sides of the rectangular light outputting face 122 is increased. After the light emitted from the LED 12 transmits through the lens 14, the energy intensity distribution of the light irradiated from the LED 12 along the long side of the rectangular light outputting face 122 is the same as the energy intensity distribution of the light irradiated from the LED 12 along the short side of the rectangular light outputting face 122. As shown in FIG. 4, an energy distribution curve of the light irradiated from the LED 12 along the long side of the rectangular light outputting face 122 and an energy distribution curve of the light irradiated from the LED 12 along the short side of the rectangular light outputting face 122 completely overlap each other. Thus, after the light emitted from the LED 12 transmits through the lens 14, a circular symmetric luminous distribution is formed.

Figure 5:
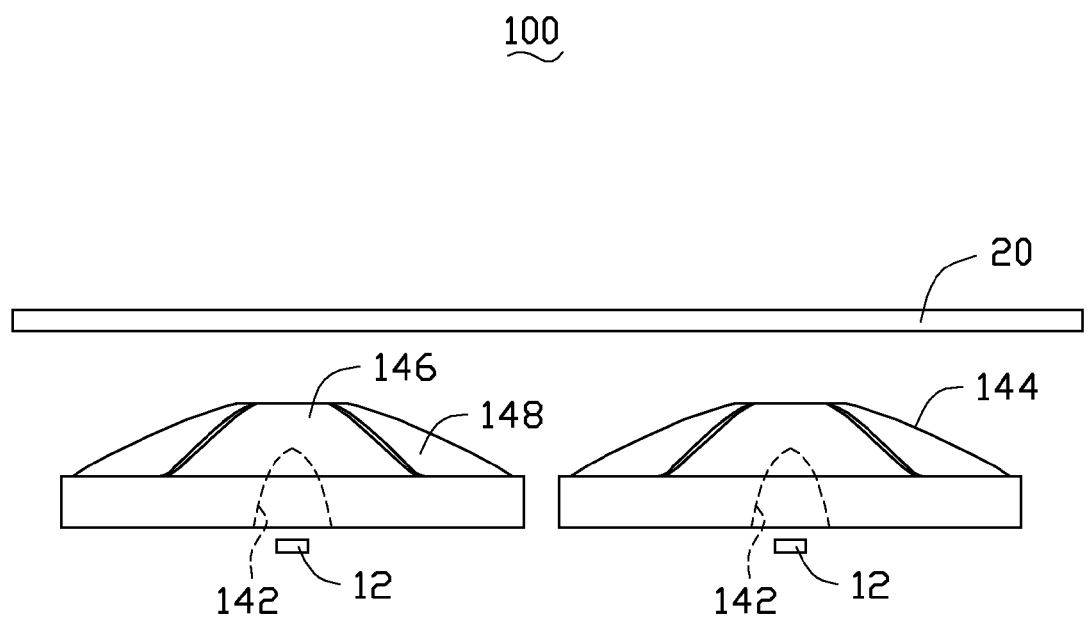
FIG. 5 is a schematic view of a direct-type backlight module using the LED element of FIG. 1.

Referring to FIG. 5, a direct-type backlight module 100 includes a plurality of LED elements 10, and a diffusing plate 20 located above and covering the LED elements 10. An evenness of the light emitted from the LED elements 10 increases via the diffusing plate 20. By the uniform light distribution from the LED element 10 by means of the lens 14, a distance between the LED 12 and the diffusing plate 20 can be decreased so that the backlight module 100 can be compact.

According to the disclosure, after the light emitted from the elongated LED 12 transmits through the lens 14, a circular symmetric luminous distribution is formed. Therefore, the elongated LEDs can be used in both the direct-type backlight module and the edge-type backlight module, which facilitates reducing costs for inventory management of the LEDs.

It is believed that the disclosure and its advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An LED element comprising:
an elongated LED having a rectangular light outputting face; and
a lens located above the LED and having a light inputting face and a light outputting face, and the light outputting face of the lens being protruded upwardly from a periphery toward a center thereof and comprising a first light outputting portion and two second light outputting portions located at two opposite sides of the first light outputting portion, respectively, a generally M-shaped boundary being defined between the first light outputting portion and each second light outputting portion;
wherein the first light outputting portion is a curved face which protrudes outwardly and upwardly away from the LED, each second light outputting portion is a curved face which has an edge at the boundary which is below an edge of the first light outputting portion at the boundary whereby a wall is defined between the two edges, the first light outputting portion converges light output along a long side of the rectangular light outputting face of the LED, the second light outputting portion diverges light output along a short side of the rectangular light outputting face of the LED, after the light emitted from the LED transmits through the lens, an energy intensity distribution along a direction of the long side of the rectangular light outputting face of the LED being the same as an energy intensity distribution along a direction of the short side of the rectangular light outputting face of the LED;
wherein after the light emitted from the elongated LED transmits through the lens, a circular symmetric luminous distribution is formed.

2. The LED element of claim 1, wherein the lens has a circular outer circumference.

3. The LED element of claim 1, wherein the light inputting face of the lens is a curved face which recesses inwardly and faces the light outputting face of the LED.

4. The LED element of claim 3, wherein the light inputting face of the lens is a spherical surface or an aspheric surface.

5. The LED element of claim 1, wherein the first light outputting portion comprises a circular first portion located at a center of the lens, and two second portions extending slantwise downwardly from two opposite sides of the first portion, respectively.

6. The LED element of claim 5, wherein the first portion of the first light outputting portion is flat and directly opposite to the LED.

7. The LED element of claim 5, wherein a projection of each second portion of the first light outputting portion on a horizontal plane is fan-shaped and symmetrical about a first axis extending through a center of the lens and dividing the first light outputting portion into two symmetrical halves, the two second light outputting portions being symmetrical to each other in respect to the first axis.

8. The LED element of claim 5, wherein an outer circumference of each second portion of the first light outputting portion is shorter than an outer circumference of each second light outputting portion.

9. The LED element of claim 5, wherein a projection of each second light outputting portion on a horizontal plane is fan-shaped and symmetrical about a second axis extending through the center of the lens and perpendicular to the first axis.

10. A direct-type backlight module comprising:
a diffusing plate; and
a plurality of elongated LED elements covered by the diffusing plate, each of the LED elements comprising:
an LED having a rectangular light outputting face; and
a lens located above the LED and having a light inputting face and a light outputting face, and the light outputting face of the lens being protruded upwardly from a periphery toward a center thereof and comprising a first light outputting portion and two second light outputting portions located at two opposite sides of the first light outputting portion, respectively, a generally M-shaped boundary being defined between the first light outputting portion and each second light outputting portion;

wherein the first light outputting portion is a curved face which protrudes outwardly and upwardly away from the LED, each second light outputting portion is a curved face which has an edge at the boundary which is below an edge of the first light outputting portion at the boundary whereby a wall is defined between the two edges, the first light outputting portion converges light output along a long side of the rectangular light outputting face of the LED, the second light outputting portion diverges light output along a short side of the rectangular light outputting face of the LED, after the light emitted from the LED transmits through the lens, an energy intensity distribution along a direction of the long side of the rectangular light outputting face of the LED being the same as an energy intensity distribution along a direction of the short side of the rectangular light outputting face of the LED;

wherein after the light emitted from the elongated LED transmits through the lens, a circular symmetric luminous distribution is formed.

11. The direct-type backlight module of claim 10, wherein the lens has a circular outer circumference.

12. The direct-type backlight module of claim 10, wherein the light inputting face of the lens is a curved face which recesses inwardly and faces the light outputting face of the LED.

13. The direct-type backlight module of claim 12, wherein the light inputting face of the lens is a spherical surface or an aspheric surface.

14. The direct-type backlight module of claim 10, wherein the first light outputting portion comprises a circular first portion located at a center of the lens, and two second portions extending slantwise downwardly from two opposite sides of the first portion.

15. The direct-type backlight module of claim 14, wherein the first portion of the first light outputting portion is flat and directly opposite to the LED.

16. The direct-type backlight module of claim 14, wherein a projection of each second portion of the first light outputting portion on a horizontal plane is fan-shaped and symmetrical about an axis extending through a center of the lens and dividing the first light outputting portion into two symmetrical halves, the two second light outputting portions being symmetrical to each other in respect to the axis.

17. The direct-type backlight module of claim 14, wherein an outer circumference of each second portion of the first light outputting portion is shorter than an outer circumference of each second light outputting portion.

18. The direct-type backlight module of claim 10, wherein the wall defined between the two edges is perpendicular to a bottom face of the lens.

* * * * *